United States Patent
Gill et al.

(10) Patent No.: US 6,707,647 B2
(45) Date of Patent: Mar. 16, 2004

(54) MAGNETIC HEAD WITH THIN GAP LAYERS

(75) Inventors: Hardayal Singh Gill, Portola Valley, CA (US); Douglas Johnson Werner, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 09/772,780

(22) Filed: Jan. 29, 2001

(65) Prior Publication Data
US 2002/0101690 A1 Aug. 1, 2002

(51) Int. Cl.$^7$ .............................................. G11B 5/33
(52) U.S. Cl. ...................................................... 360/320
(58) Field of Search ................................. 360/317, 320

(56) References Cited

U.S. PATENT DOCUMENTS

| | | | |
|---|---|---|---|
| 5,302,461 A | 4/1994 | Anthony | 428/472 |
| 5,568,335 A * | 10/1996 | Fontana et al. | 360/320 |
| 5,712,612 A | 1/1998 | Lee et al. | 338/32 |
| 5,764,567 A | 6/1998 | Parkin | 365/173 |
| 5,801,984 A | 9/1998 | Parkin | 365/158 |
| 5,862,022 A | 1/1999 | Noguchi et al. | 360/113 |
| 5,898,547 A | 4/1999 | Fontana, Jr. et al. | 360/113 |
| 5,962,080 A | 10/1999 | Tan et al. | 427/529 |
| 5,966,012 A | 10/1999 | Parkin | 324/252 |
| 6,452,761 B1 * | 9/2002 | Carey et al. | 360/320 |

FOREIGN PATENT DOCUMENTS

| JP | 09198619 | 7/1997 |
|---|---|---|
| JP | 11181564 | 7/1999 |

* cited by examiner

Primary Examiner—George J. Letscher
(74) Attorney, Agent, or Firm—Robert O. Guillot; IPLO Intelectual Property Law Offices

(57) ABSTRACT

The hard disk drive of the present invention includes a magnetic head wherein the read head portions have gap insulation layers between the magnetic shields. The gap insulation layers are made up of multilayered laminations of an oxide or nitride of a metal such as aluminum, silicon, chromium, and tantalum. A preferred embodiment of the present invention includes laminated G1 and G2 gap insulation layers having 5–10 laminations, and having a total thickness of approximately 50 Å to 500 Å.

26 Claims, 5 Drawing Sheets

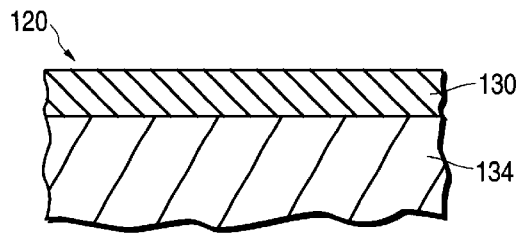
FIG.5A
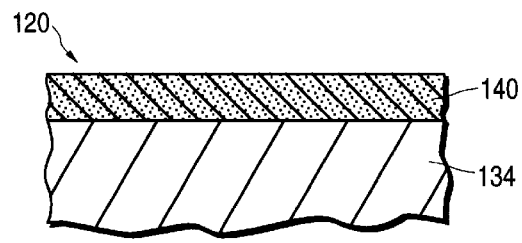
FIG.5B
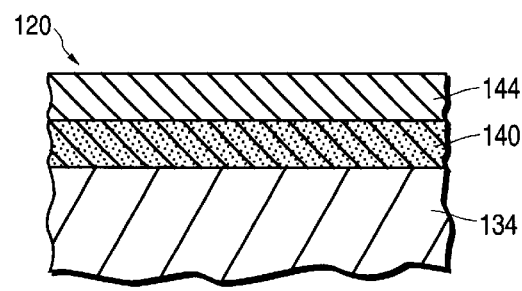
FIG.5C
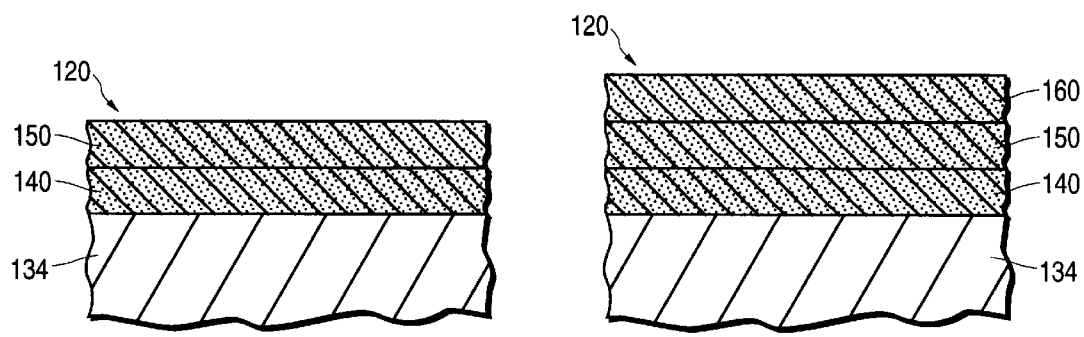
FIG.5D     FIG.5E

MAGNETIC HEAD WITH THIN GAP LAYERS

BACKGROUND OF THE INVENTION

1. Field of the Invention

The present invention relates generally to the fabrication of magnetic heads for hard disk drives, and particularly to the fabrication of insulation layers within the read head portions of such magnetic heads.

2. Description of the Prior Art

To increase the areal data storage density of hard disks for hard disk drives, the data bits within the tracks upon such hard disks are written closer together, so that a greater number of bits per inch are recorded. To efficiently read data from a data track with such a greater number of bits, the read head portion of a magnetic head of a hard disk drive must be structured such that the resolution of the read heads is increased.

The read heads of the prior art magnetic heads are fabricated utilizing thin film deposition techniques on an upper surface of a wafer substrate. In fabricating the read head portion, a first electrical insulation layer is deposited upon the surface of the substrate, followed by the deposition of a magnetic shield, followed by a first gap insulation layer, followed by the fabrication of a plurality of layers and structures that generally include a plurality of active read head magnetic layers, magnetic hard bias elements and electrical lead traces. Thereafter, a second gap insulation layer is deposited, followed by a second magnetic shield, another insulation layer, and further magnetic head components such as write head structures, that complete the magnetic head.

One of the problems associated with prior art read heads so designed is that they have thick gap insulation layers. Consequently, the prior art read heads display low resolution because resolution is adversely affected by the spacing between the two magnetic shields i.e. thicker the gap insulation layers, greater the spacing between the two magnetic shields and lower the resolution. Even read heads designed with thinner gap insulation layers are not free of problems. One of the problems associated with prior art read heads with thinner gap insulation layers is the increased potential for electrical shorts between the electrical leads (and the sensor) and the magnetic shields due to the thinness of the gap insulation layers. Another problem associated with prior art read heads with thinner gap insulation layers is the lack of efficient electrical insulation. In these read heads, the gap insulation layers are so thin that they are unable to perform the function of electrical insulation effectively.

The present invention seeks to solve these problems associated with prior art read heads by providing new gap materials and deposition methods to produce thinner gap insulation layers that ensure high resolution of the read heads and that also provide robust electrical insulation.

SUMMARY OF THE INVENTION

The hard disk drive of the present invention includes a magnetic head wherein the read head portions of the magnetic head have novel gap insulation layers between the sensor and the two magnetic shields. In a preferred embodiment, the second of the gap insulation layers is made up of two portions. The first gap insulation portion is disposed over electrical leads in the read head and is thick enough to help ensure electrical insulation between the electrical leads and the second magnetic shield. The second portion of the gap insulation layer is disposed over the first gap insulation portion and also directly over the top portion of the sensor. It can be thinner than the first gap insulation portion. The second gap insulation portion ensures minimal spacing between the two magnetic shields. The gap insulation layers are made up of multilayer laminations wherein each lamination in the multilayered structure is made of an oxide of a metal selected from the group consisting of aluminum, silicon, chromium and tantalum. In accordance with the present invention, the fabrication of an individual lamination layer is a two step process starting with the deposition of a thin film of metal on a substrate layer, and then the oxidation of the deposited metal film to form a first metal oxide lamination. Each lamination may have a thickness of 10 Å to 50 Å. The process is repeated until a multilayered lamination structure of a desired thickness is formed. A preferred embodiment of the present invention includes 5–10 laminations in the multilayer structure, such that the total thickness of a gap insulation layer is approximately 50 Å–500 Å. The laminations are each fabricated by a process such as sputter deposition.

It is an advantage of the magnetic head of the present invention that it includes thin G1 and G2 gap insulation layers such that the distance between the magnetic shields of the read head is reduced.

It is another advantage of the magnetic head of the present invention that it includes a G2 insulation layer having a first gap insulation layer portion and a second gap insulation portion, wherein the first gap insulation portion is disposed over the read head electrical leads and the second portion is disposed over the sensor and the first gap insulation layer portion.

It is a further advantage of the magnetic head of the present invention that it includes a read head with a G2 insulation layer having a thinner second gap insulation portion formed of a laminated multilayer structure that reduces the distance between the sensor and the second magnetic shield.

These and other features and advantages of the present invention will no doubt become apparent to those skilled in the art after having read the following detailed description, which makes reference to the several figures of the drawings.

IN THE DRAWINGS

FIG. 5a is a side cross-sectional view of a first fabrication step of a gap insulation layer of the present invention;

FIG. 5b is a side cross-sectional view of a second fabrication step of the gap insulation layer of the present invention;

FIG. 5c is a side cross-sectional view of a third fabrication step of the gap insulation layer of the present invention;

FIG. 5d is a side cross-sectional view of a fourth fabrication step of the gap insulation layer of the present invention;

FIG. 5e is a side cross-sectional view of a fifth fabrication step of the gap insulation layer of the present invention;

DETAILED DESCRIPTION OF THE PREFERRED EMBODIMENTS

Figure 1:
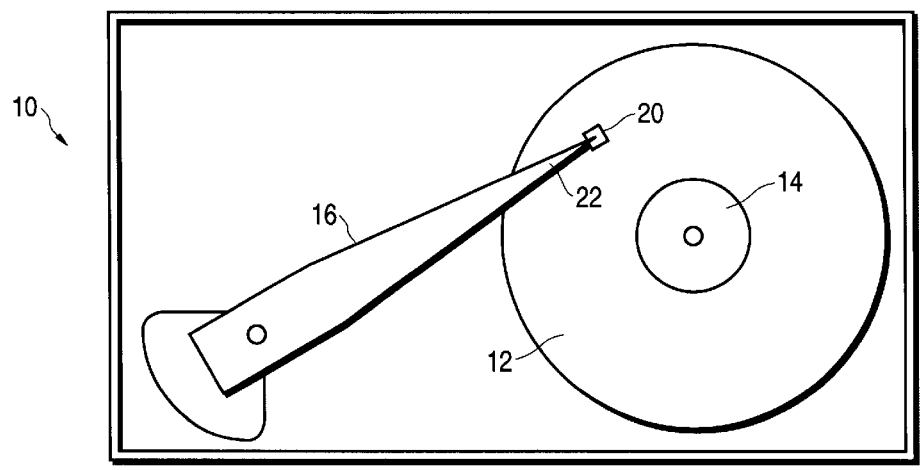
FIG. 1 is a top plan view of a typical hard disk drive including a magnetic head of the present invention.

FIG. 1 is a top plan view that depicts significant components of a hard disk drive, which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention disposed upon a distal end 22 of the actuator arms 16. A typical hard disk drive 10 may include a plurality of disks 12 that are rotatably mounted upon the spindle 14 and a plurality of actuator arms 16 having a magnetic head 20 mounted upon the distal end 22 of the actuator arms. As is well known to those skilled in the art, when the hard disk drive 10 is operated, the hard disk 12 rotates upon the spindle 14 and the magnetic head 20 acts as an air bearing slider that is adapted for flying above the surface of the rotating disk. The slider includes a substrate base upon which the various layers and structures that form the magnetic heads are fabricated. Such heads are fabricated in large quantities upon a wafer substrate and subsequently sliced into discrete magnetic heads 20.

Figure 2:
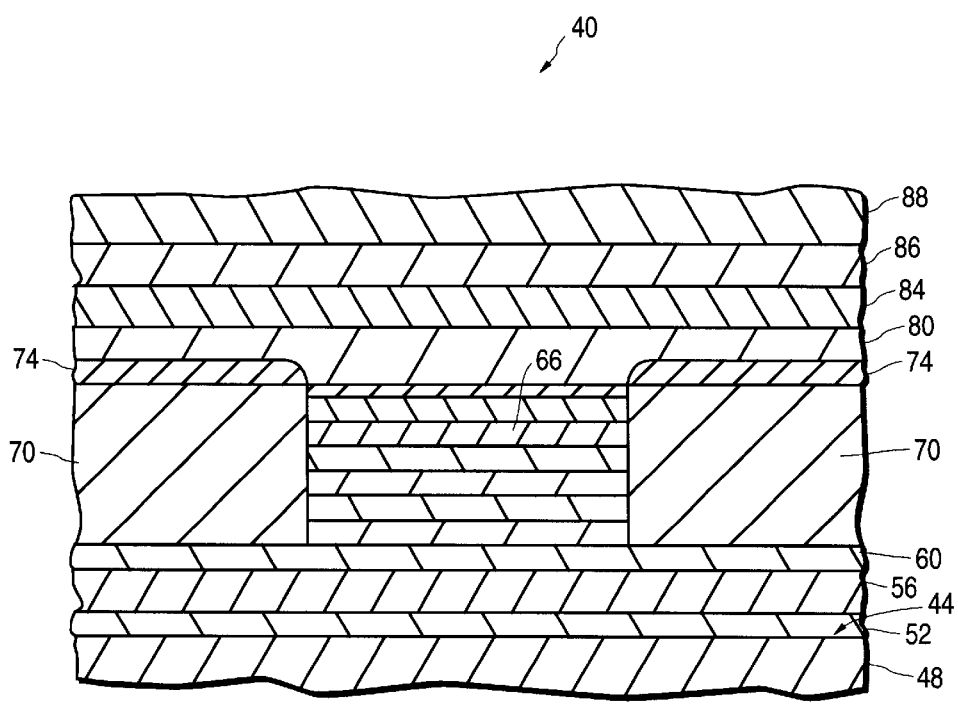
FIG. 2 is a side cross-sectional view of a prior art read head portion of a magnetic head.

FIG. 2 is a cross-sectional view of a prior art read head portion 40 of a magnetic head shown to facilitate the understanding of the present invention. As is well known to those skilled in the art, the prior art read head structure 40, is fabricated utilizing thin film deposition techniques on an upper surface 44 of a wafer substrate 48. In fabricating the read head portion 40 of the prior art magnetic head, a first electrical insulation layer 52 is deposited upon the surface 44 of the substrate 48, followed by the deposition of a first magnetic shield 56, followed by a first gap insulation layer 60, followed by the fabrication of a plurality of layers and structures that generally include a plurality of active read head magnetic layers 66, magnetic hard bias elements 70 and electrical lead traces 74. Thereafter, a second gap insulation layer 80 is deposited, followed by a second magnetic shield 84, another insulation layer 86, and further magnetic head components (not shown), such as write head structures, that complete the magnetic head. In some prior art magnetic head designs, the second magnetic shield 84 may also function as one of the magnetic poles of the write head structure.

A problem that exists with the prior art magnetic heads is that the read head portions in these magnetic heads have thick gap insulation layers. Consequently, the prior art read heads lack good resolution powers. Second, the prior art read heads designed with thinner gap insulation layers suffer from the potential risk of electrical shorts occurring between the sensor or the electrical leads and the magnetic shields because the electrical insulation integrity of the gap insulation layers in these read heads is not sufficient. The present invention seeks to eliminate these problems through the fabrication of laminated gap insulation layers that help provide high resolution read heads with robust electrical insulation.

Figure 3:
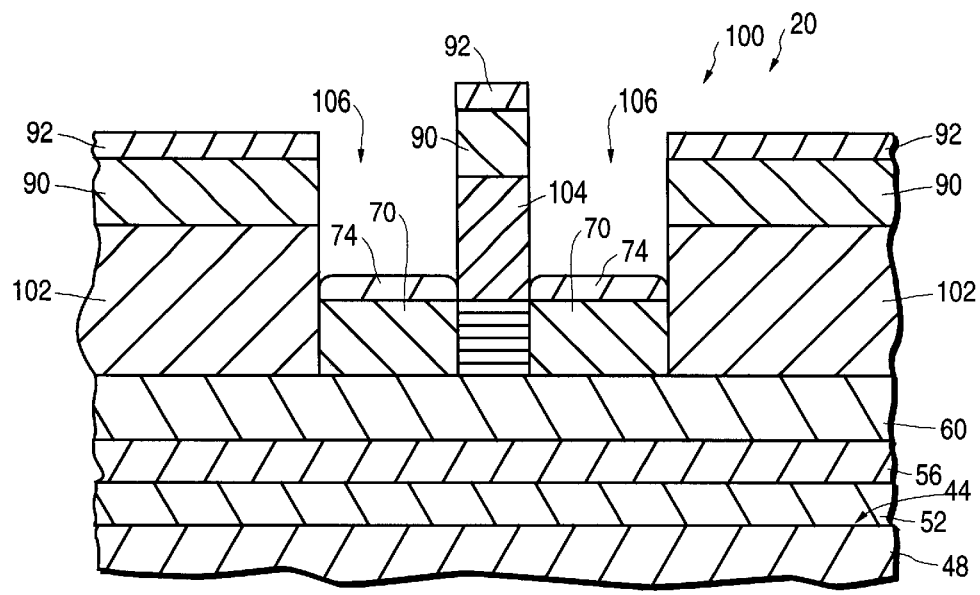
FIG. 3 is a side cross-sectional view of a fabrication step of the read head of the magnetic head of the present invention.

FIG. 3 is a side cross-sectional view of a fabrication step for the gap insulation layers of the read head portion 100 of the magnetic head 20 of the hard disk drive 10 of the present invention as shown in FIG. 1. As depicted in FIG. 3, the read head portion 100 of the present invention includes several features that may be substantially identical to features of the prior art read head 40, and such substantially identical features are identically numbered. The read head portion 100 of the present invention thus includes a first insulation layer 52 that is fabricated upon the surface 44 of a wafer substrate 48. A first magnetic shield structure 56 is fabricated upon the first insulation layer 52 and a first gap insulation layer 60 (G1 layer) is fabricated upon the first magnetic shield 56. As is conducted in the prior art head fabrication process, a patterned photoresist mask 102 is fabricated with a portion 104 to cover the active read head sensor layers 66 and with openings 106 for hard bias elements 70 and electrical leads 74. Thereafter the hard bias elements 70 and electrical leads 74 are deposited onto the wafer and into the openings 106, and hard bias material 90 and electrical lead material 92 is also deposited on top of the photoresist mask 102. The second gap insulation layer (G2 layer) 108 of the present invention is next fabricated. A preferred embodiment of the G2 gap insulation layer 108 comprised of two insulation portions, and the fabrication of the first portion 112 of the G2 gap insulation layer 108 of the present invention is next described with the aid of FIG. 4, which is an expanded view of the central portion of FIG. 3.

Figure 4:
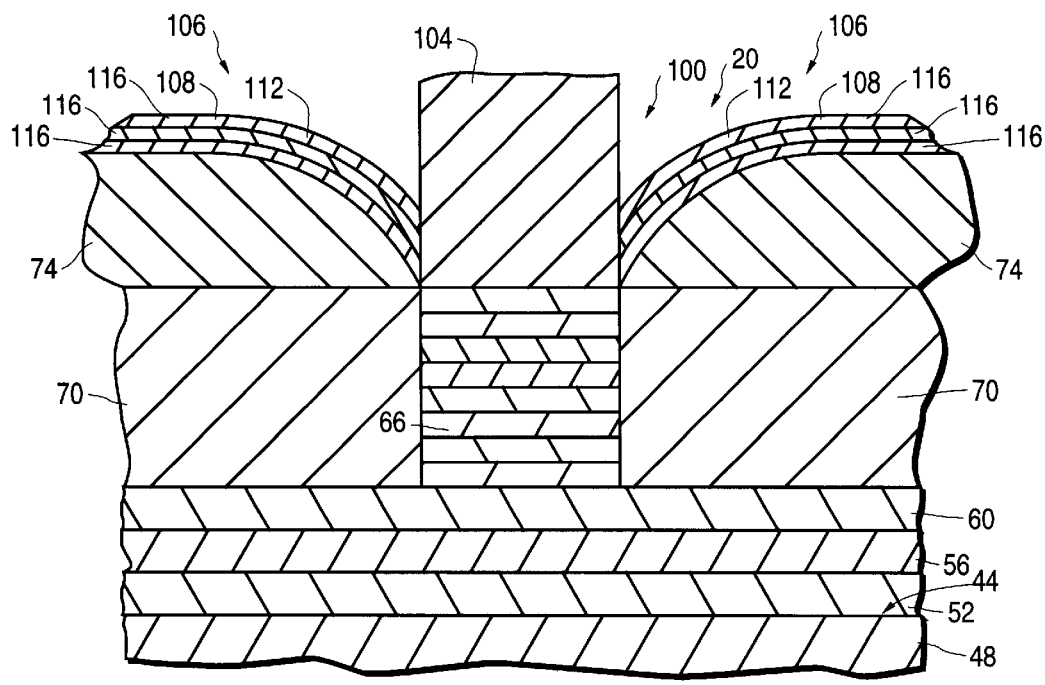
FIG. 4 is a side cross-sectional view of a further fabrication step of the read head of the magnetic head of the present invention.

As depicted in FIG. 4, the first portion 112 of the G2 insulation layer 108 is deposited over the surface of the wafer into the openings 106 and onto the electrical leads 74. It is to be noted that the portion 104 of the photoresist mask that is deposited on top of the sensor layers 66 prevents the insulation layer 112 from being deposited upon the sensor 66. The layer 112 is comprised of a plurality of layers 116 that form a multilayered laminated structure. A detailed description of the fabrication of a multilayer laminated structure which is utilized as layer 112 is next presented with the aid of FIGS. 5a–5d.

FIG. 5a is a side cross-sectional view of the first fabrication step to form an insulation layer 120 which serves as the G1 and G2 gap layers of the present invention. As depicted in FIG. 5a, a film of metal 130 is deposited on top of a substrate 134 preferably using a sputter deposition process that is conducted in a vacuum deposition chamber. The thickness of the metal film 130 is in the range of approximately 10–50 Å, and in the preferred embodiment, the thickness of the metal film is in the range of approximately 10–20 Å. In accordance with a preferred embodiment of the present invention, the metal film may be comprised of aluminum, silicon, chromium or tantalum.

FIG. 5b is a side cross-sectional view of the second fabrication step of the insulation layer 120. As shown in FIG. 5b, the thin metal film 130 deposited over the substrate is then oxidized by the introduction of oxygen into the vacuum deposition chamber. This results in the formation of a lamination of metal oxide 140 on the substrate, which corresponds to a first lamination layer 116 of the G2 gap layer portion 112. It is important that the thin metal film 130 be oxidized completely because incomplete oxidation may cause remnants of the metal to be left behind in the gap insulation layer causing them to interfere with the layer's function of electrical insulation. It is also important that the metal thin film 130 not exceed approximately 50 Å in thickness because a thick metal film will not oxidize completely.

FIG. 5c is a side cross-sectional view of the third fabrication step of the insulation layer 120 of the present invention. As shown in FIG. 5c, a second thin film metal layer 144 is deposited over the first lamination layer 140.

FIG. 5d is a side cross-sectional view of the fourth fabrication step of the insulation layer 120 of the present invention. In the fourth step, the second thin film layer 144 deposited over the first lamination 140 is oxidized in the same manner as the first metal layer 130. This results in the formation of a second lamination layer of metal oxide 150 on top of the substrate 134 which corresponds to a second lamination 116 of the G2 gap layer portion 112.

FIG. 5e is a side cross-sectional view showing further fabrication steps of the insulation layer 120 of the read head portion of a magnetic head of the present invention including a further metal oxide layer 160 which corresponds to a further lamination 116 of the G2 gap layer portion 112. As shown in FIG. 5e, a multilayered laminated structure 120 is formed by the repeated metal thin film layer deposition and oxidation steps described above with regard to metal oxide layers 140, 150 and 160 above, until a desired thickness of the insulation layer 120 is achieved. With reference to FIG. 4, an embodiment of the first portion 112 of the G2 gap insulation layer 108 is formed with 5–10 laminations 116, each having a thickness of approximately 10 Å to 50 Å; such that the first portion 112 has a total thickness in the range of from approximately 50 Å to approximately 500 Å, and in a preferred embodiment of the present invention has a thickness of approximately 250 Å.

Figure 6:
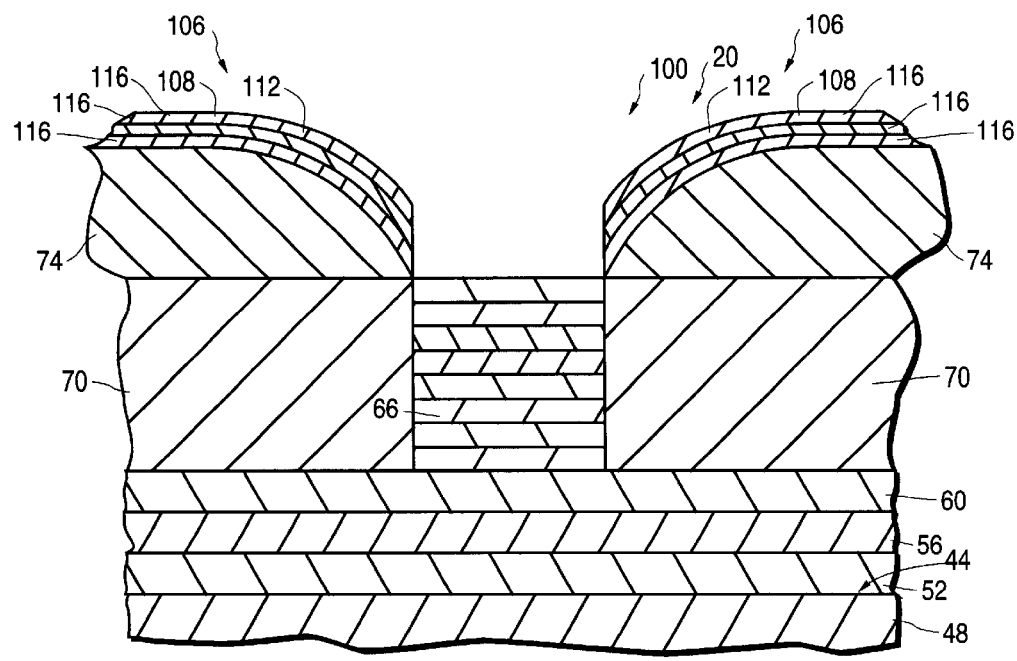
FIG. 6 is a side cross-sectional view of another fabrication step of the read head of the present invention showing multilayer laminations forming the first portion of the G2 gap insulation layer over the electrical leads as shown after photoresist mask lift-off.

FIG. 6 is a side cross-sectional view of the read head of the present invention showing a further fabrication step of a second insulation portion 180 of the G2 insulation layer 108 of the present invention. As depicted in FIG. 6, the photoresist mask 102 (and center portion 104) is removed by the use of a suitable solvent as is known to those of ordinary skill in the art, leaving the laminations 112 deposited in the photoresist openings intact and covering the electrical leads 74.

Figure 7:
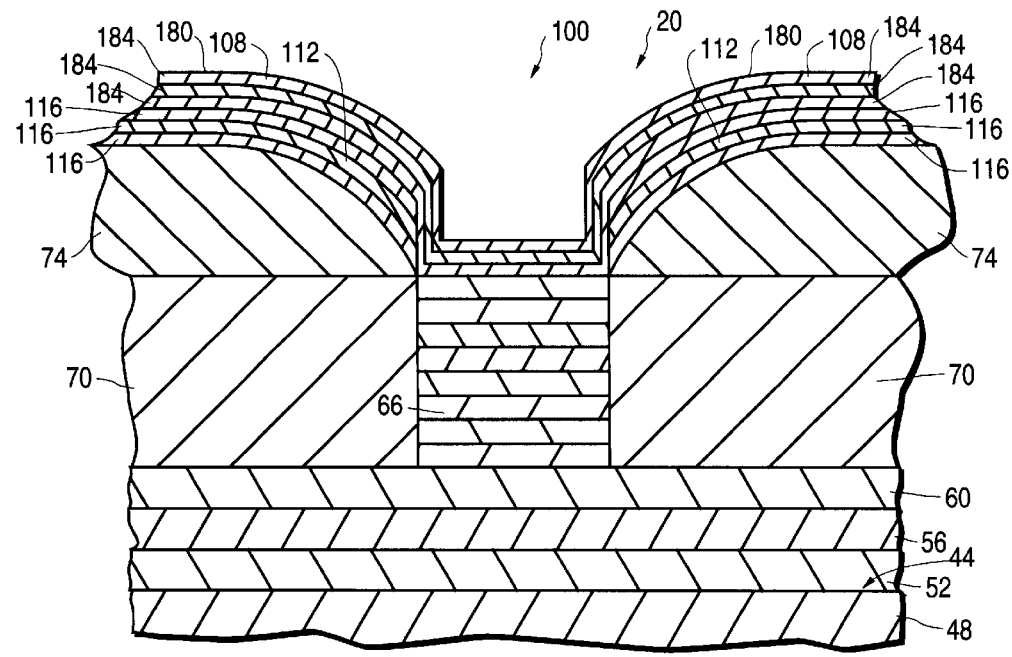
FIG. 7 is a side cross-sectional view of a further fabrication step of the read head of the present invention showing multilayer laminations of the second portion of the G2 gap insulation layer over the sensor and the first portion of the G2 gap insulation layer.

FIG. 7 is a side cross-sectional view of a read head of the magnetic head of the present invention showing the fabrication of further multilayer laminations 184 of metal oxide forming the second insulation layer portion 180 of the G2 gap insulation layer 108. The second insulation layer portion 180 covers both the active areas of the sensor 66 and the first portion 112 of the G2 insulation layer 108 on top of the electrical leads 74. The metal oxide laminations 184 are deposited utilizing the insulation layer fabrication process described hereinabove with reference to FIGS. 5a–e.

Figure 8:
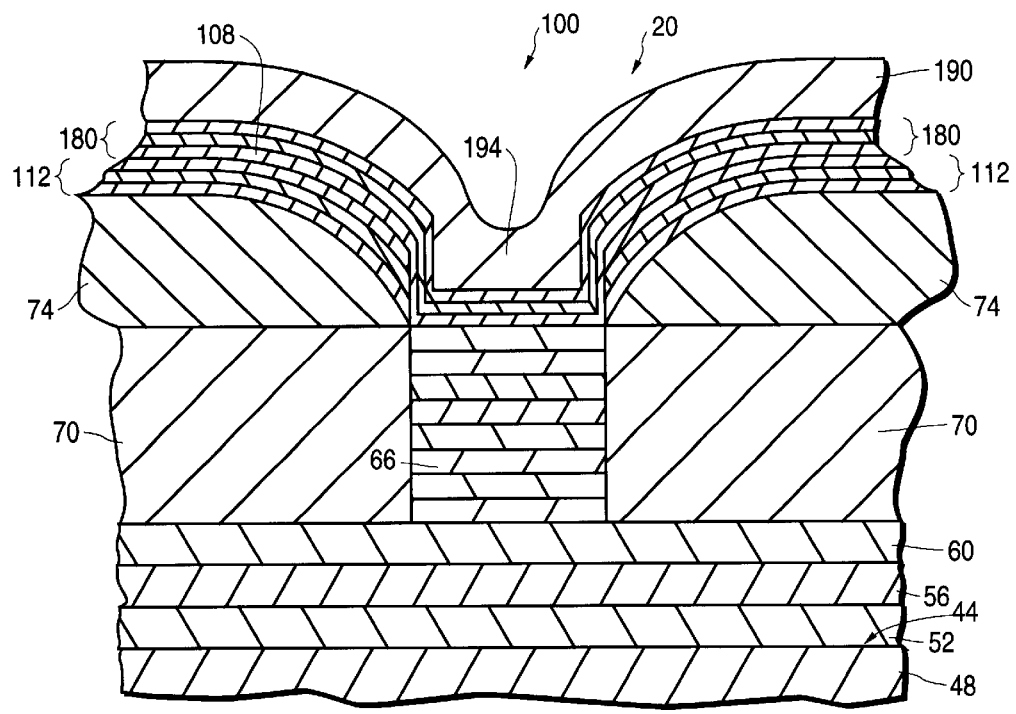
FIG. 8 is a side cross-sectional view of yet another fabrication step of the read head with the contoured second magnetic shield on top of the G2 gap layer of the present invention.

Following the fabrication of the second insulation portion 180 of the G2 insulation layer 108, the second magnetic shield 190 is fabricated, and FIG. 8 is a side cross-sectional view of the read head portion 100 of the magnetic head 20 of the present invention showing the contoured magnetic shield 190 deposited over the G2 gap insulation layer 108 of the present invention, such that a central portion 194 of the shield 190 is formed over the sensor 66. Further components of the magnetic head 20 of the present invention, such as write head structures are thereafter fabricated as known to those skilled in the art.

Figure 9:
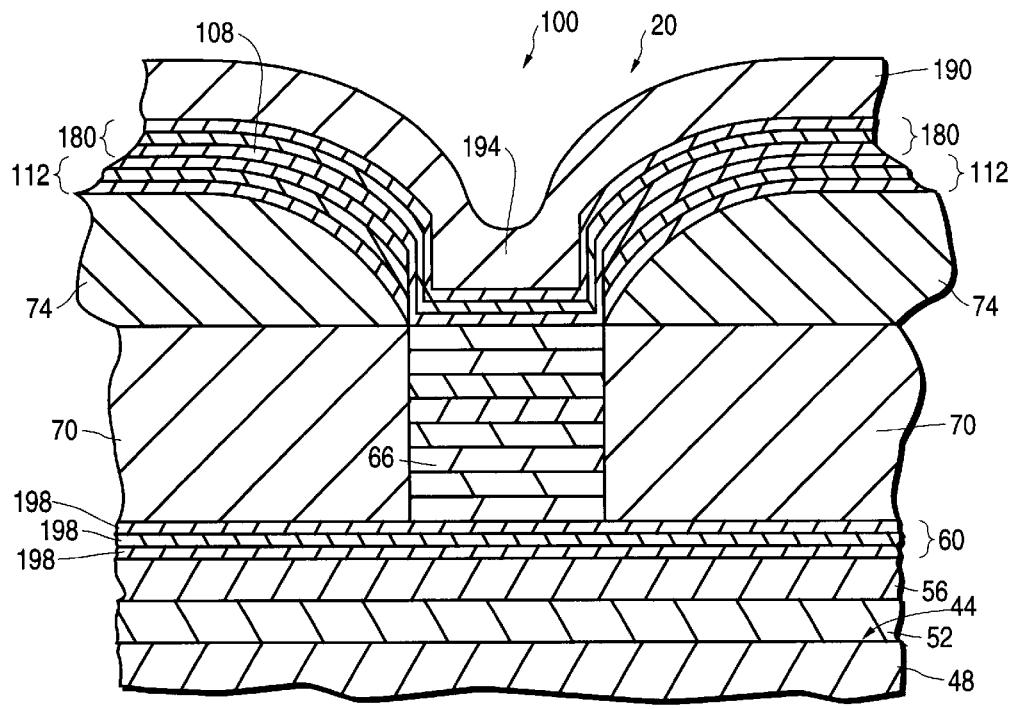
FIG. 9 is a side cross-sectional view of a read head of the present invention with both the G1 and G2 gap insulation layers being formed of multilayer laminations.

FIG. 9 is a side cross-sectional view of a further embodiment of the present invention in which the G1 gap insulation layer 60 is also formed of multilayer laminations 198. The G1 gap insulation layer laminations 198 are fabricated in the same manner as the first G2 gap insulation layer 112 as described hereinabove with reference to FIGS. 5a–e. In accordance with an alternative embodiment of the present invention, a multilayer structure of metal nitride laminations (rather than metal oxide laminations) may be fabricated to form the G1 and/or G2 gap insulation layers. Metal nitride layers alternating with metal oxide layers are also within the scope of the invention.

It will therefore be understood that the read head portion 100 of the magnetic head 20 has G1 and G2 gap insulation layers disposed between the magnetic shields 56 and 190 and the sensor 66. In a preferred embodiment, the first insulation layer portion 112 of the G2 insulation layer 108 is a thicker portion deposited directly over the electrical leads, and its purpose is to help to electrically insulate the electrical leads from the second magnetic shield 190. The second insulation portion 180 of the G2 gap insulation layer 108 may be a thinner portion disposed over the sensor 66 (and the first portion 112), and it allows for a minimal insulation gap distance between the sensor 66 and the central portion 194 of the magnetic shield 190 located proximate the sensor 66, while at the same time minimizing electrical shorts between the sensor 66 and the shield 190. Where the GI gap insulation layer is approximately 250 Å thick and the second portion 180 of the G2 layer 108 is approximately 250 Å, and the thickness of the sensor 66 is approximately 500 Å, the shield to shield distance of the magnetic head 20 is approximately 1000 Å. The magnetic head 20 therefore has increased resolution of magnetic data bits, and this results in a hard drive 10 of the present invention wherein the magnetic head 20 is able to read magnetic disks with increased areal data storage density.

While the invention has been shown and described with reference to certain preferred embodiments, it will be understood by those skilled in the art that various alterations in form and detail may be made therein without departing from the true spirit and scope of the invention. It is therefore intended that the following claims cover all such alterations and modifications in form and detail that nevertheless include the true spirit and scope of the invention.

What we claim is:

1. A magnetic head comprising:
    a read head structure having a first magnetic shield, a second magnetic shield, and a sensor disposed therebetween, wherein gap insulation layers are disposed between each magnetic shield and the sensor, and wherein at least one of said gap insulation layers includes multilayer laminations of insulation material; and
    wherein each lamination is formed entirely of an oxide or a nitride of a metal selected from the group consisting of aluminum, silicon, chromium and tantalum.

2. A magnetic head as recited in claim 1, wherein the multilayer laminated structure is composed of approximately 5–10 laminations.

3. A magnetic head as recited in claim 2, wherein the thickness of each lamination is approximately 10 Å to 50 Å.

4. A magnetic head as recited in claim 3, wherein the preferred thickness of each lamination is approximately 10 Å to 20 Å.

5. A magnetic head as recited in claim 1, wherein the spacing between the first magnetic shield layer and a portion of the second magnetic shield layer, said second magnetic shield portion being located proximate to the sensor portion of the head, is approximately 1000 Å.

6. A magnetic head as recited in claim 5, wherein the spacing between the first magnetic shield and the sensor is approximately 50 Å–500 Å.

7. A magnetic as recited in claim 5, wherein the spacing between the sensor and the portion of the second magnetic shield layer located proximate to the sensor is approximately 50 Å–500 Å.

8. A magnetic head as recited in claim 1, wherein the spacing between the sensor and the portion of the second magnetic shield layer located proximate to the sensor is approximately 250 Å.

9. A hard disk drive comprising:

a motor for rotating a spindle;

a thin film magnetic disk mounted on the spindle; and an actuator assembly having a magnetic head mounted thereon wherein said magnetic head includes:

a read head structure having a first magnetic shield, a second magnetic shield, and a sensor disposed therebetween, wherein gap insulation layers are disposed between each magnetic shield and the sensor, and, wherein at least one of said gap insulation layers includes multilayer laminations of insulation material; and wherein each lamination is formed entirely of an oxide or nitride of a metal selected from the group consisting of aluminum, silicon, chromium, and tantalum.

10. The disk drive as recited in claim 9, wherein the multilayer laminated structure is composed of approximately 5–10 laminations.

11. The disk drive as recited in claim 10, wherein the thickness of each lamination is in the range of 10 Å to 50 Å.

12. The disk drive as recited in claim 11, wherein the preferred thickness of each lamination is in the range of 10 Å to 20 Å.

13. The disk drive as recited in claim 9, wherein the spacing between the first magnetic shield layer and a portion of the second magnetic shield layer located proximate to the sensor is approximately 1000 Å.

14. The disk drive as recited in claim 13, wherein the spacing between the first magnetic shield and the sensor is approximately 50 Å to 500 Å.

15. The disk drive as recited in claim 13, wherein the spacing between the sensor and the portion of the second magnetic shield located proximate to the sensor is approximately 50 Å to 500 Å.

16. The disk drive as recited in claim 9, wherein the spacing between the sensor and the portion of the second magnetic shield layer located proximate to the sensor is preferably 250 Å.

17. A magnetic head comprising:

a first magnetic shield and a second magnetic shield;

a sensor being disposed between said magnetic shields;

two electrical leads for supplying electrical current to said sensor, said leads being disposed proximate to said sensor; and gap insulation layers disposed between said magnetic shields and said sensor, wherein at least one of said gap insulation layers has a first gap insulation portion and a second gap insulation portion, and wherein said first gap insulation portion includes multilayered laminations of insulation material that are disposed upon said electrical leads, and said second gap insulation portion includes multilayer laminations of insulation material that are disposed upon said sensor and upon said first gap insulation portion.

18. A magnetic head as recited in claim 17, wherein each lamination is formed of an oxide of a metal selected from the group consisting of aluminum, silicon, chromium and tantalum.

19. A magnetic head as recited in claim 17, wherein each lamination is formed of a nitride of a metal selected from the group consisting of aluminum, silicon, chromium and tantalum.

20. A magnetic head as recited in claim 17, wherein the multilayered laminated structures are each composed of approximately 5–10 laminations.

21. A magnetic head as recited in claim 17, wherein the thickness of each lamination is approximately 10 Å to 50 Å.

22. A magnetic head as recited in claim 17, wherein the thickness of each lamination is in the preferred range of approximately 10 Å to 20 Å.

23. A magnetic head as recited in claim 17, wherein the spacing between the first magnetic shield layer and a portion of the second magnetic shield layer located proximate to said sensor is approximately 1000 Å.

24. A magnetic head as recited in claim 23, wherein the spacing between the first magnetic shield and the sensor is approximately 50 Å–500 Å.

25. A magnetic head as recited in claim 24, wherein the spacing between said sensor and the portion of said magnetic shield layer located proximate to said sensor is approximately 50 Å–500 Å.

26. A magnetic head as recited in claim 17, wherein the spacing between said sensor and the portion of the magnetic shield layer located proximate to said sensor is approximately 250 Å.

* * * * *